United States Patent [19]
Beernink et al.

[11] Patent Number: 5,612,719
[45] Date of Patent: Mar. 18, 1997

[54] GESTURE SENSITIVE BUTTONS FOR GRAPHICAL USER INTERFACES

[75] Inventors: Ernest H. Beernink, San Carlos; Gregg S. Foster, Woodside; Stephen P. Capps, San Carlos, all of Calif.

[73] Assignee: Apple Computer, Inc., Cupertino, Calif.

[21] Appl. No.: 228,460

[22] Filed: Apr. 15, 1994

Related U.S. Application Data

[63] Continuation of Ser. No. 985,588, Dec. 3, 1992, abandoned.

[51] Int. Cl.$^6$ ................................................ G09G 5/00
[52] U.S. Cl. ........................ 345/173; 345/172; 345/179
[58] Field of Search ........................ 382/13, 59, 187, 382/313, 314, 189; 178/18, 19; 340/706, 712; 345/156, 168, 173, 169, 179, 104, 172, 180, 182, 183

[56] References Cited

U.S. PATENT DOCUMENTS

| | | | |
|---|---|---|---|
| 4,139,837 | 2/1979 | Liljenwall | 340/146.3 SY |
| 4,545,023 | 10/1985 | Mizzi | 364/709 |
| 4,972,496 | 11/1990 | Sklarew | 382/13 |
| 5,194,852 | 3/1993 | More et al. | 345/173 |
| 5,260,697 | 11/1993 | Barrett | 345/173 |
| 5,347,295 | 9/1994 | Agulnick et al. | 345/156 |
| 5,398,045 | 3/1995 | Sach et al. | 345/172 |
| 5,398,310 | 3/1995 | Tchao et al. | 395/144 |

FOREIGN PATENT DOCUMENTS

| | | | |
|---|---|---|---|
| 2193023 | 1/1988 | United Kingdom | G06K 9/00 |

OTHER PUBLICATIONS

O'Connor, Rory J., "Apple banking on Newton's brain," San Jose Mercury News, Apr. 22, 1992.

Weiman et al, "A Step Toward the Future" Macword, Aug. 1992, p. 129.

M. Soviero, "Your World According to Newton" Popular Science, Sep. 1992.

F. Abatemarco, "From the Editor" Popular Science, Sep. 1992, p. 4.

*Primary Examiner*—Richard Hjerpe
*Assistant Examiner*—Lun-Yi Lao
*Attorney, Agent, or Firm*—Hickman Beyer & Weaver

[57] ABSTRACT

A gesture sensitive button for graphical user interfaces characterized by a digital computer, a screen coupled to the digital computer, a pointer mechanism used for pointing locations on the screen, a "button" image displayed on the screen, and a gesture recognizer for detecting gestures made on the screen by the pointing mechanism. The button is responsive to at least two different button gestures made on the screen on or near the button. A process implementing the gesture sensitive button of the present invention includes: providing a button image on a computer screen; detecting a gesture made on the screen by a pointer such as a stylus, mouse, or trackball; determining whether the gesture is associated with the button image; and initiating one of at least two processes if the gesture is associated with the button image. The gesture sensitive button conserves real estate on the computer screen by permitting a single button to control multiple functions and processes.

20 Claims, 8 Drawing Sheets

5,612,719

GESTURE SENSITIVE BUTTONS FOR GRAPHICAL USER INTERFACES

This patent application is a continuation of U.S. patent application Ser. No. 07/985,588, filed on Dec. 3, 1992, now abandoned.

BACKGROUND OF THE INVENTION

This invention relates generally to computer systems, and more particularly to graphical user interfaces for computer systems.

Graphical user interfaces or GUI are becoming increasingly popular with computer users. It is generally accepted that computers having graphical user interfaces are easier to use, and that it is quicker to learn an application program in a GUI environment than in a non-GUI environment.

A relatively new type of computer which is well suited for graphical user environments is the pen-based computer system. A pen-based computer system is typically a small, hand-held computer where the primary method for inputting data includes a "pen" or stylus. A pen-based computer system is often housed in a relatively flat enclosure, and has a dual-function display assembly which serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus across the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion. Besides serving as a notepad, pen-based computers can provide a number of useful functions, such as serving as an address book, an appointment calendar, a to-do list, etc.

Pen-based computer systems often include "buttons" on their screen which can be "pressed" to perform a desired function or process. These buttons, sometimes referred to as "soft" buttons, are images produced on the screen by the CPU which can be activated by placing the tip of a stylus on the button image in a gesture often referred to as a "tap." Often, upon the detection of a tap, the CPU will change the image of the button to make it appear as if it was "pressed," and then will perform the desired function or process.

Soft buttons provided on computer screens are attractive user interfaces because they emulate the use of well-known buttons controls provided on electric and electronic devices. However, soft buttons have their limitations. For example, prior art soft buttons perform only a single function or process upon activation. Since it is desirable and often necessary to provide a number of different functions to a user, computer screens tend to become littered with button images. This is particularly a problem with pen-based computer systems where the amount of screen area ("screen real-estate") is limited. It is therefore desirable to provide a soft-button functionality for a computer user interface which minimizes the use of screen real estate.

SUMMARY OF THE INVENTION

The present invention provides a gesture sensitive button for graphical user interfaces which is capable of detecting more than one screen gesture. In consequence, a single soft-button can be used to control a number of user functions and processes, thereby conserving valuable screen real estate.

A gesture sensitive button for a graphical user interface in accordance with the present invention includes a CPU, a screen coupled to the CPU, a stylus for pointing to locations on the screen, a soft-button displayed on the screen, and a gesture recognizer for recognizing gestures associated with the button. The button is responsive to at least two different button gestures including a tap gesture and a more complex gesture. Upon the detection of a gesture, the CPU will perform a designated function or process dependent upon which button gesture is detected.

A method for providing a gesture sensitive button for a graphical user interface in accordance with the present invention includes the steps of detecting a gesture made upon a screen of a digital computer by a pointing means, determining whether the gesture is associated with a button image provided on the screen, and initiating one of at least two processes if the gesture is determined to be associated with the button. A gesture is determined to be associated with the button if: (1) it contacts or is physically close to the button; and (2) it is one of the types of gestures associated with that button. One of the detected gesture is preferably a tap gesture, while the one or more additional gestures are more complex gestures such as a "check-mark", an "X-mark", etc.

A major advantage of the present invention is that a single soft-button on a computer screen can be used to control a number of functions or processes. This is particularly advantageous in the context of pen-based computer systems, where screen real estate is often at a premium.

These and other advantages of the present invention will become apparent upon a reading of the following descriptions and a study of the various figures of the drawing.

BRIEF DESCRIPTION OF THE DRAWINGS

FIG. 7b is a cross-sectional view taken along line 7b—7b of FIG. 7a;

DETAILED DESCRIPTION OF THE PREFERRED EMBODIMENTS

The present invention is well suited for pointer based computer systems such as the pen-based, stylus-based and mouse-based systems that are currently popular. For the purposes of illustration, the invention will be described in connection with a pen-based system.

Figure 1:
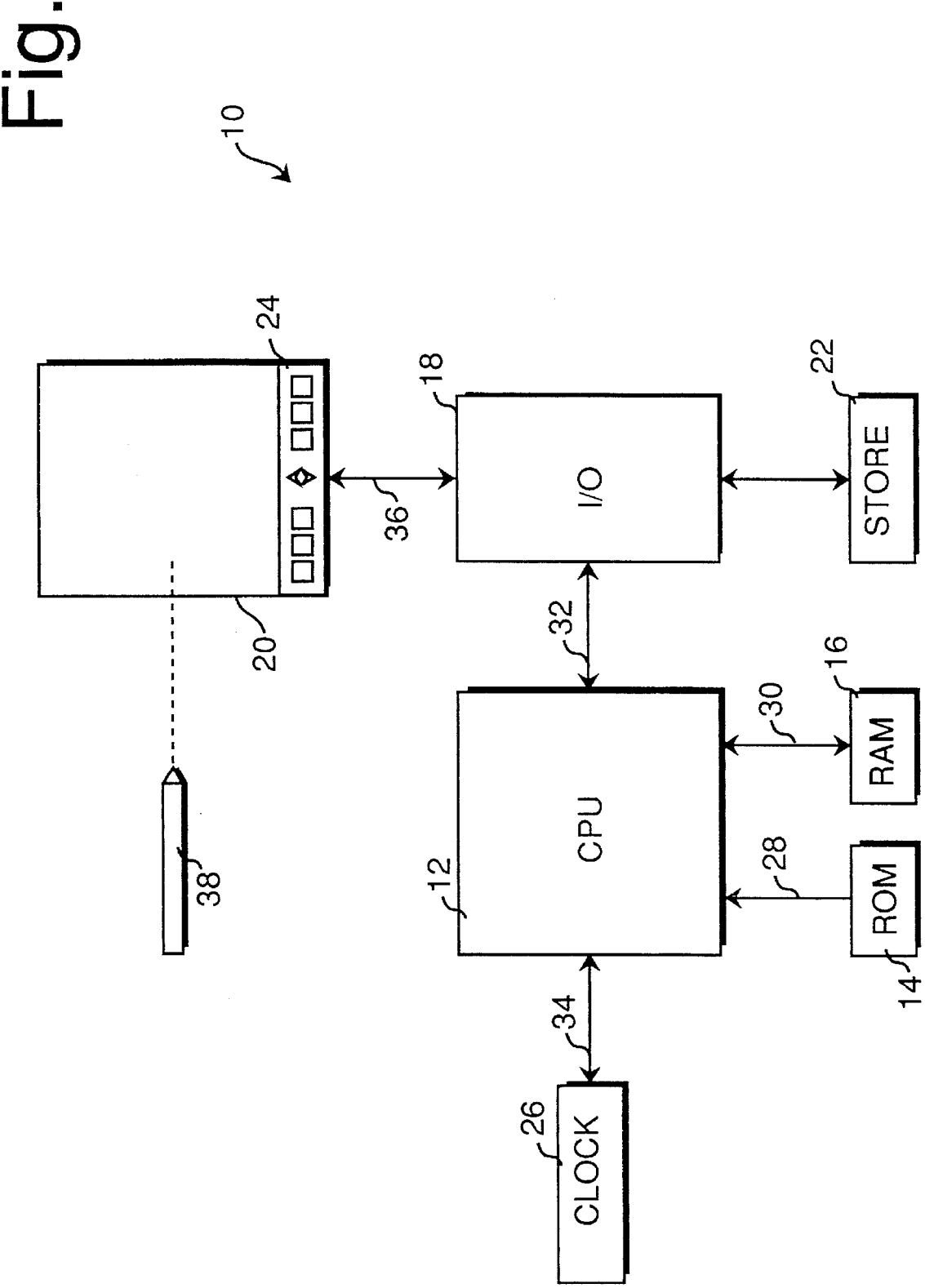
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or nonvolatile memory such as flash memory, a keypad 24, and a clock 26.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 28. ROM 14 contains the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the keypad 24.

Clock 26 provides a series of clock pulses and is typically coupled to an interrupt port of CPU 12 by a data line 34. The clock pulses are used to time various functions and events relating to the computer system 10. The clock 26 can be eliminated and the clock function replaced by a software clock running on CPU 12, but this tends to be a wasteful use of CPU processing power. In the present invention, clock 26 provides clock pulses at 60 hertz (Hz).

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. These position sensitive membranes are also readily available on the commercial market. Combination display assemblies such as display assembly 20 which include both the LCD and the input membrane are available from such vendors as Scriptel Corporation of Columbus, Ohio.

The keypad 24 can comprise an array of switches. In the present embodiment, the keypad 24 comprises mechanical buttons which overlie the bottom edge of the membrane which covers the LCD display. When the buttons are depressed, the membrane senses the pressure and communicates that fact to the CPU 12 via I/O 18.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Some type of mass storage 22 is generally considered desirable. However, the mass storage 22 can be eliminated by providing a sufficient amount of RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, nonvolatile memory such as flash memory, battery backed RAM, PC-data cards, or the like.

In operation, information is input into the pen-based computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

Figure 2:
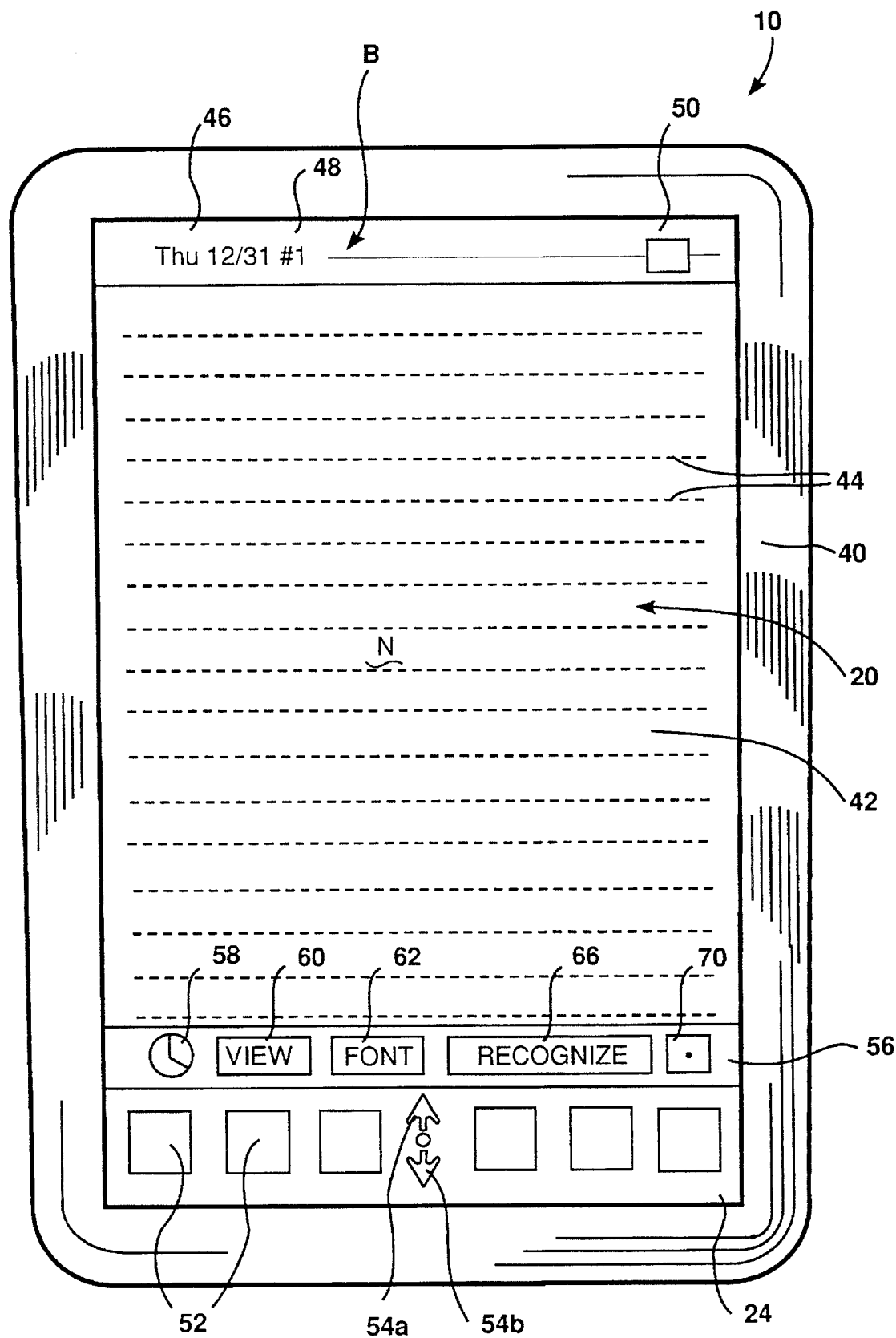
FIG. 2 is a top plan view of the screen, case, and keypad of the computer system of FIG. 1.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 24.

Upon power-up, pen based computer system 10 displays on screen 42 an initial note area N including a breaker bar B and a number of guidelines 44. The breaker bar B preferably includes the day and date of creation 46 of the note N, a note number 48, and a "router" button 50 which allows notes to be dispatched to a printer, facsimile, the trash, etc. The optional guidelines 44 aid a user in entering text, graphics, and data into the pen-based computer system 10.

In this preferred embodiment, the keypad 24 is not a part of the viewing screen 42 but rather, is a permanent array of input buttons coupled to the CPU 12 by I/O circuitry 18. Alternatively, the keypad 24 could comprise "soft buttons" generated at a convenient location on the screen 42, in which case a "button" would be activated by touching the stylus to the screen over the image of the button. The keypad 24 preferably includes a number of dedicated function buttons 52 and a pair of scroll buttons 54A and 54B. The operation of the scroll buttons 54A and 54B, and other aspects of computer system 10 are discussed in greater detail in co-pending U.S. patent application Ser. No. 07/868,013, filed 04/13/92 on behalf of Tchao et al. and entitled "Method for Manipulating Notes on a Computer Display", now U.S. Pat. No. 5,398,301. That application is assigned to the assignee of the present application and its disclosure is hereby incorporated by reference in its entirety.

The screen illustrated in FIG. 2 is referred to as the "notepad", and is an application program running under the operating system of the pen based computer system 10. In this preferred embodiment, the notepad is a special or "base" application which is always available beneath higher level applications. The notepad application, like other applications, run within a window, which in this instance comprises the entire viewing screen 42. Therefore, as used herein, a "window" is the entire screen or any portion of an entire screen which is dedicated to a particular application program.

A status bar 56 is provided at the bottom of the notepad application. The status bar 56 is provided with a number of active areas including a real time clock 58, a view button 60, a font button 62, a formulas button 64, a text button 66, a graphics button 68, and a nib button 70. Co-pending patent application U.S. Ser. No. 07/976,970, filed 11/16/92 on behalf of Foster et al., entitled "Status Bar for Application Windows" and assigned to the assignee of the present invention describes the operation of the status bar, and is hereby incorporated herein by reference in its entirety.

Figure 3A:
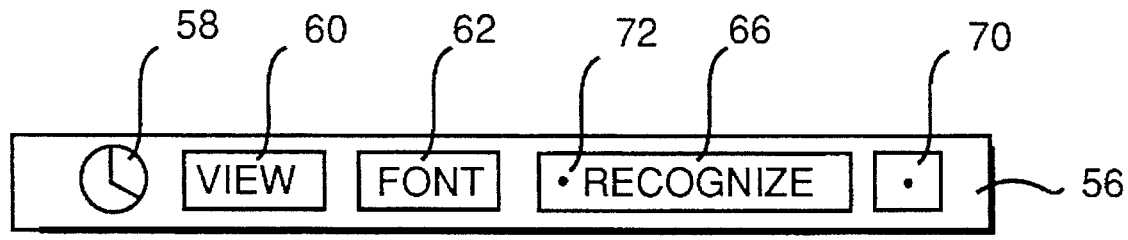
FIG. 3a is a view of the status bar shown in FIG. 2 where a "recognize" button has been contacted by a "tap" gesture.

In FIG. 3a, the status bar 56, the clock icon 58 and buttons 60–70 are shown. Each of the buttons 60–70 can be activated by the tip of stylus 38. Preferably, the buttons such as recognized button 66 are the projected images of software objects produced by object-oriented programming techniques. For the purpose of illustration, the operation of the "recognize" button 66 will be described.

When a user wishes to activate the recognize button 66, he or she makes a gesture with the stylus 38 to the button 66. The simplest gesture is the "pen-down" gesture or "tap." As used herein, a "tap" gesture is one where the tip of the stylus 38 contacts the surface of the screen 42 at substantially one point. In actual practice, the stylus may move slightly over a number of adjacent pixels due to the unsteadiness of the human hand. The term "tap" also will refer to the placement of the tip of the stylus 38 on the screen 42 and its subsequent removal within a pre-determined period of time. Some buttons are activated by a "tap" gesture where the stylus contacts and depresses the button, while other buttons are activated by a tap gesture where a button is contacted and then released by removing the tip of stylus 38 from the screen 42. Therefore, the distinguishing feature of a "tap" is that the stylus is not moved substantially over the surface of the screen but, rather, contacts the screen 42 in substantially one point.

Figure 3B:
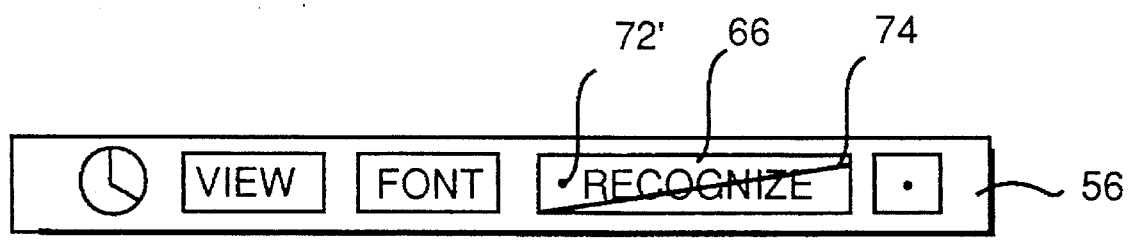
FIG. 3b is the view of FIG. 3a after the CPU 12 has reacted to the tap gesture.

FIG. 3b illustrates the result of detection of the tap gesture 72. After the stylus 38 has been removed from the screen, a diagonal bar 74 is drawn across the button 66 to indicate that the recognize function has been turned off. Another tap at 72' removes the diagonal bar 74 and turns the recognize function on.

Figure 4A:
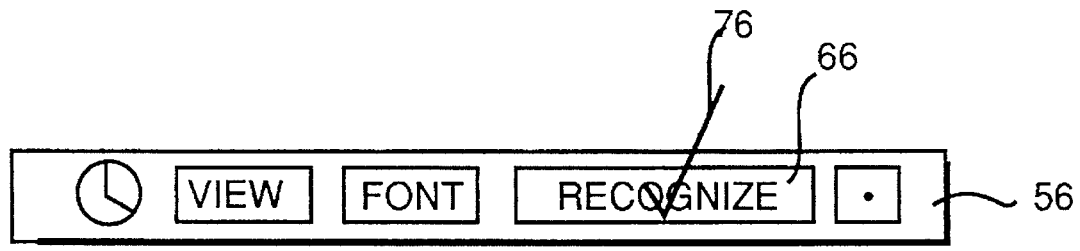
FIG. 4a is the view of FIG. 3a where a "check-mark" gesture has been made on the recognize button.
Figure 4B:
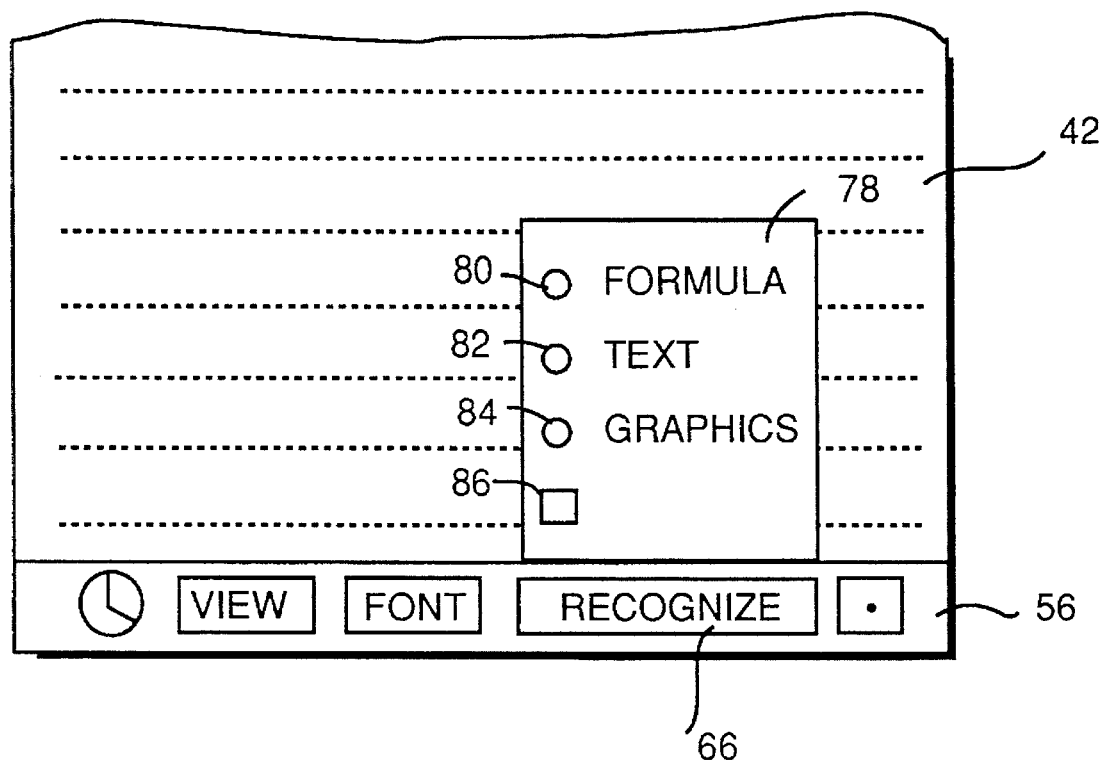
FIG. 4b is the view of FIG. 4a illustrating the result of the check-mark gesture on the recognize button.

In FIG. 4a, a second gesture 76 in the form of a "check-mark" is formed over the recognize button 66. As seen in FIG. 4b, this alternative gesture 76 creates a different result then the tap gesture 72 of FIG. 3a. In this instance, the alternative gesture 76 causes a "pop-up" window 78 to appear which includes a number of "radio buttons" 80, 82 and 84, and a close box 86. One of the recognizers, namely the formula recognizer, the text recognizer, or the graphics recognizer, can be turned on by contacting a radio button 80, 82, or 84, respectively. The window 78 can be closed by contacting a "close box" 86 with the tip of the stylus 38.

It can be seen from a comparison of FIGS. 3a and 4a that the two different gestures on the button 66 resulting in two different functions or processes being undertaken by the system 10. By providing two or more functions or processes per button, valuable real estate on the screen 42 of the system 10 can be preserved.

Figure 5:
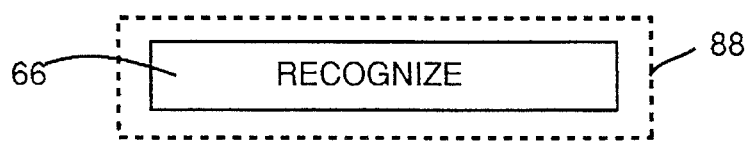
FIG. 5 is a detail view of the recognize button surrounded by a bounding box.

In FIG. 5, the system provides recognize button 66 with a bounding box 88. A "bounding box" is simply a rectangular box which encloses an object with a small buffer zone. Therefore, the coordinates of the bounding box 88 can be calculated in a straightforward manner from a knowledge of the coordinates of button 66. For example, the lower left-hand corner bounding box 88 has coordinates ($X_{min}-\Delta X$, $Y_{min}-\Delta Y$) where $X_{min}$ and $Y_{min}$ are the minimum X coordinate and the minimum Y coordinate of the button 66 and $\Delta X$ and $\Delta Y$ provide a small buffer zone between the corner of bounding box 88 and the button 66. Similarly, the upper right hand corner of the bounding box 88 has coordinates ($X_{max}+\Delta X$, $Y_{max}+\Delta Y$) where $X_{max}$ and $Y_{max}$ are the maximum X and Y coordinates of the button 66, and $\Delta X$, $\Delta Y$ provide a buffer zone as before. The use of the bounding box 88 makes it easier to manipulate the button 66 and to detect gestures associated with the button 66.

Figure 6A:
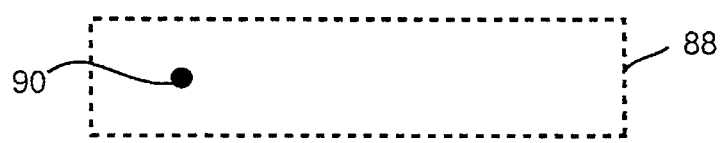
FIG. 6a illustrates the engagement of a tap gesture with the bounding box shown in FIG. 5.

In FIG. 6a, a tap gesture 90 is determined to be associated with button 66 if it falls within the bounding box 88. In other words, the X coordinate of the gesture 90 should be between $X_{min}$ and $X_{max}$, and the Y coordinate of gesture 90 should be between $Y_{min}$ and $Y_{max}$ of the bounding box 88.

Figure 6B:
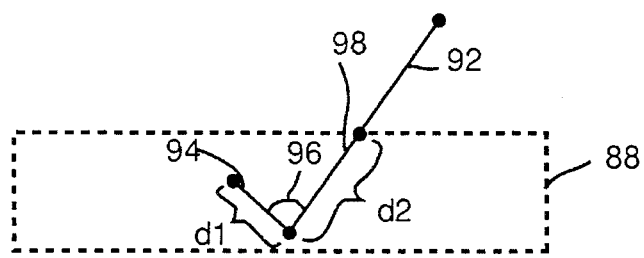
FIG. 6b illustrates the engagement of a check mark gesture with the bounding box shown in FIG. 5.

FIG. 6b illustrates a second gesture 92 in the form of a "check-mark" made on button 66. There are a number of ways of detecting this gesture 92, but a straightforward way of detecting it would be to determine whether a first point 94 is within the box 88, whether there was an angle 96 within a distance d1 of point 94, and whether a leg 98 extends at least a distance of d2 from the angle 96. This type of gesture recognition can be implemented by low-level algorithms. A number of such gesture recognizing algorithms can be found in copending U.S. patent application Ser. No. 07/888,741, of S. Capps, entitled Method for Selecting Objects on a Computer Display and assigned to the assignee of the present invention, the disclosure of which is incorporated herein by reference in its entirety.

Figure 6C:
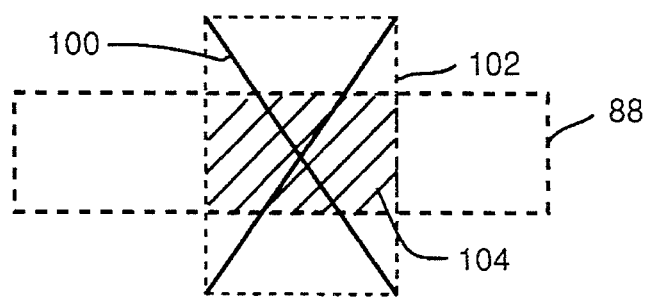
FIG. 6c illustrates the engagement of a "X-mark" gesture with the bounding box of FIG. 5.

In FIG. 6c, a second gesture 100 in the form of an "X-mark" is made on the button 66. The gesture 100 has a bounding box 102 which overlaps the bounding box 88 of the recognize button 66. Once the X-mark gesture is detected, the overlap area 104 between the two bounding boxes can be compared to the areas of the bounding boxes 88 and 102 and, if the percentage of overlap is sufficiently high, the gesture 100 is considered to be associated with the button 66. For example, if the overlap area 104 is more than 40% of the total area of either the bounding box 102 or the bounding box 88, the gesture 100 can be considered to be associated with the button 66.

The described stylus gestures, objects, and processes are preferably accomplished within the context of a "view system". In such a view system, various "views" or "objects" are stacked on top of each other, like pages of paper on a desk top. These views include a root view (such as the notepad) and virtually any number of views (within the limitations of the system) stacked on top of the root view.

The view system is a software routine which returns two pieces of information when the screen is engaged ("tapped") with a stylus. A first piece of information returned is which view or "object" was tapped. The second piece of information returned is the position of the tap on the tapped view. This location information is often returned in the form of Cartesian (x-y) coordinates. The view system therefore handles much of the routine input work for the computer system. Taps by stylus on non-active areas of the screen can be ignored by the view system. Likewise, inappropriate inputs on active areas of the screen can be ignored or can generate error conditions which can be acted upon by the system.

The term "object" has been used extensively in the preceding discussions. As is well known to software developers, an "object" is a logical software unit comprising data and processes which give it capabilities and attributes. For example, an object can be queried as to its type and can return such data as the number of words that it contains. Objects can contain other objects of the same or of a different type. Objects can also be used to project images on a screen according to their object type. There are many well known texts which describe object oriented programming. See, for example, *Object Oriented Programming for the Macintosh*, by Kurt J. Schmucher, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation,* by Brachman and Leveseque, Morgan Kaufman, San Mateo, 1985.

Figure 7A:
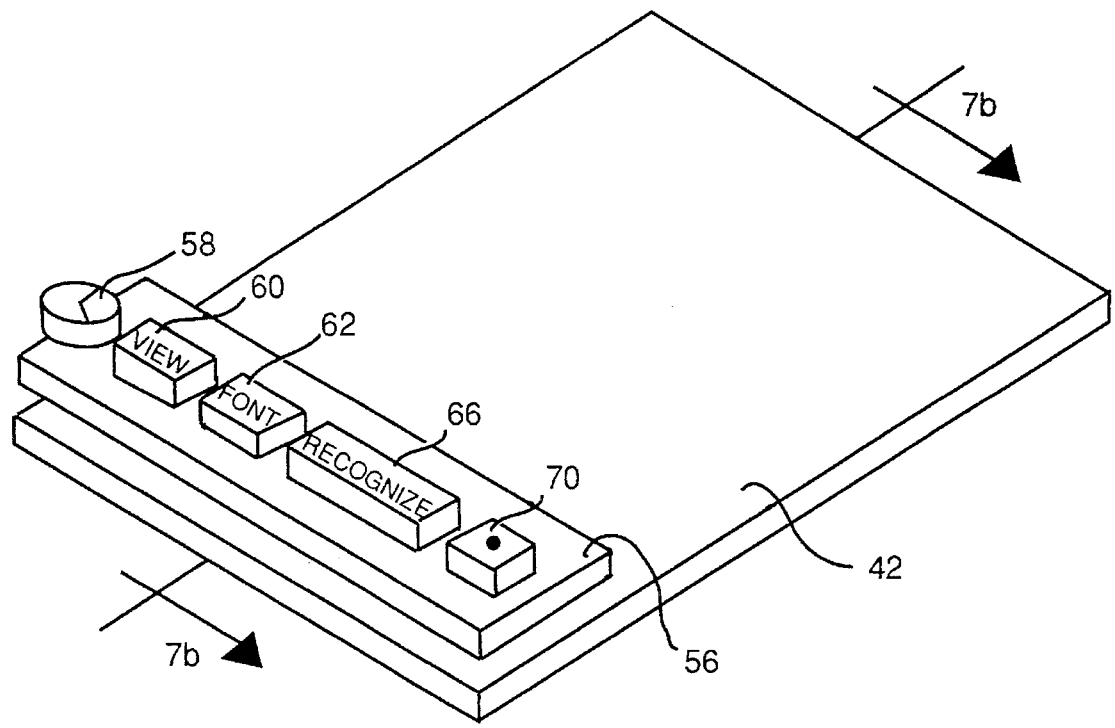
FIG. 7a is a perspective illustration of the "view system" used by the present invention.

The use of object oriented programming, frame systems, and the aforementioned view system simplifies the implementation of the processes of the present invention. In FIG. 7A, a conceptual representation of various objects in view system is shown. The notepad application on the screen 42 forms a first or "root" layer, and the status bar 56 is positioned in a second layer "over" the root layer 42. The clock 58 and buttons 60-70 are positioned in a third layer "over" the status bar 56.

Figure 7B:
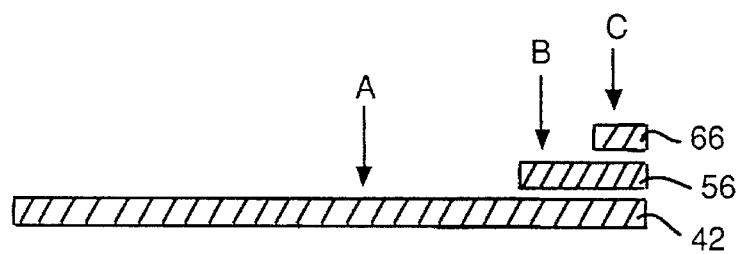

In FIG. 7b, a cross-section taken along line 7b—7b of FIG. 7a further illustrates the conceptual layering of various objects. The aforementioned viewing system automatically handles "taps" and other gestures of the stylus 38 on the screen 42 by returning information concerning which object has been gestured and where on the object the gesture occurred. For example, a gesture A on the screen 42 could create an action for the notepad application. A gesture B on the status bar 56 could be of part of a drag operation to move the status bar on the screen 42. A gesture C on recognize button 66 can activate a process associated with that button. It is therefore clear that the object oriented programming and view system software makes the implementation of the processes of the present invention less cumbersome than traditional programing techniques.

Figure 8:
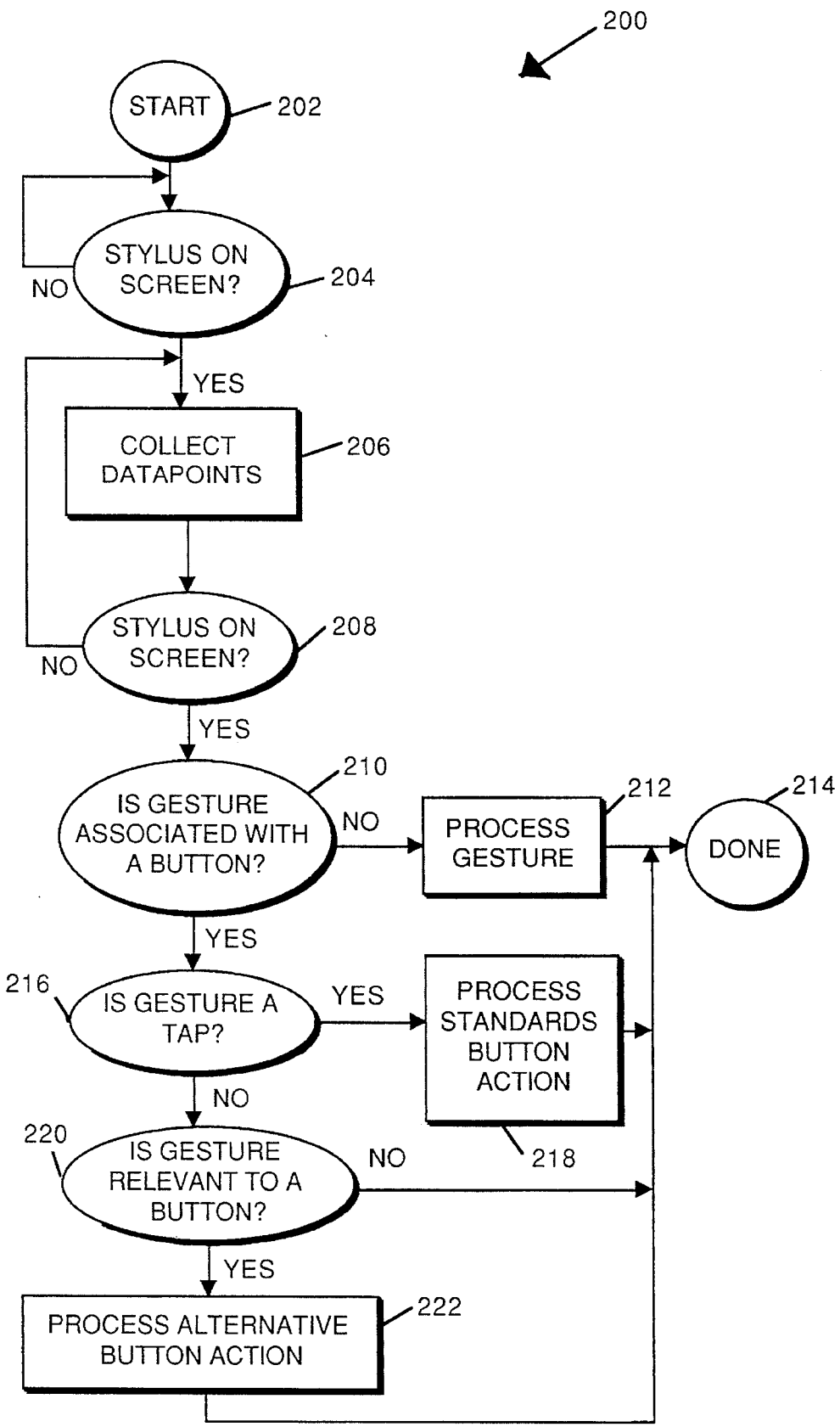
FIG. 8 is a flow diagram illustrating the process of the present invention.

In FIG. 8, a process 200 for providing a gesture sensitive button for graphical user interface is illustrated. The process begins at step 202, and, in a step 204, it is determined whether the stylus 38 is on the screen 42. If not, step 204 goes into a wait state. If the stylus is on the screen, data points are collected in a step 206 and it is determined in a step 208 whether the stylus has been lifted from the screen. If not, process control is returned to step 206. After the stylus has been lifted from the screen, it is determined in a step 210 whether the collection of data points forms a gesture associated with a button in a step 210. If the gesture is not associated with a button, the gesture is processed in a step 212 and the process 200 is completed as indicated at step 214. If it was determined by step 210 that a gesture was associated with the button, then in a step 216 it is determined whether the gesture is a tap. If the gesture was a tap, the standard function for the button is performed in step 218 and the process is completed as indicated by step 214. If the gesture is associated with a button but is not a tap, then a step 220 determines whether the gesture is relevant to the button. If the gesture is not relevant (i.e. that gesture means nothing to that button) then the process is completed as indicated at 214. If the gesture is relevant to the button, then an alternative button action is processed in step 222 and the process is completed at step 214.

Figure 9:
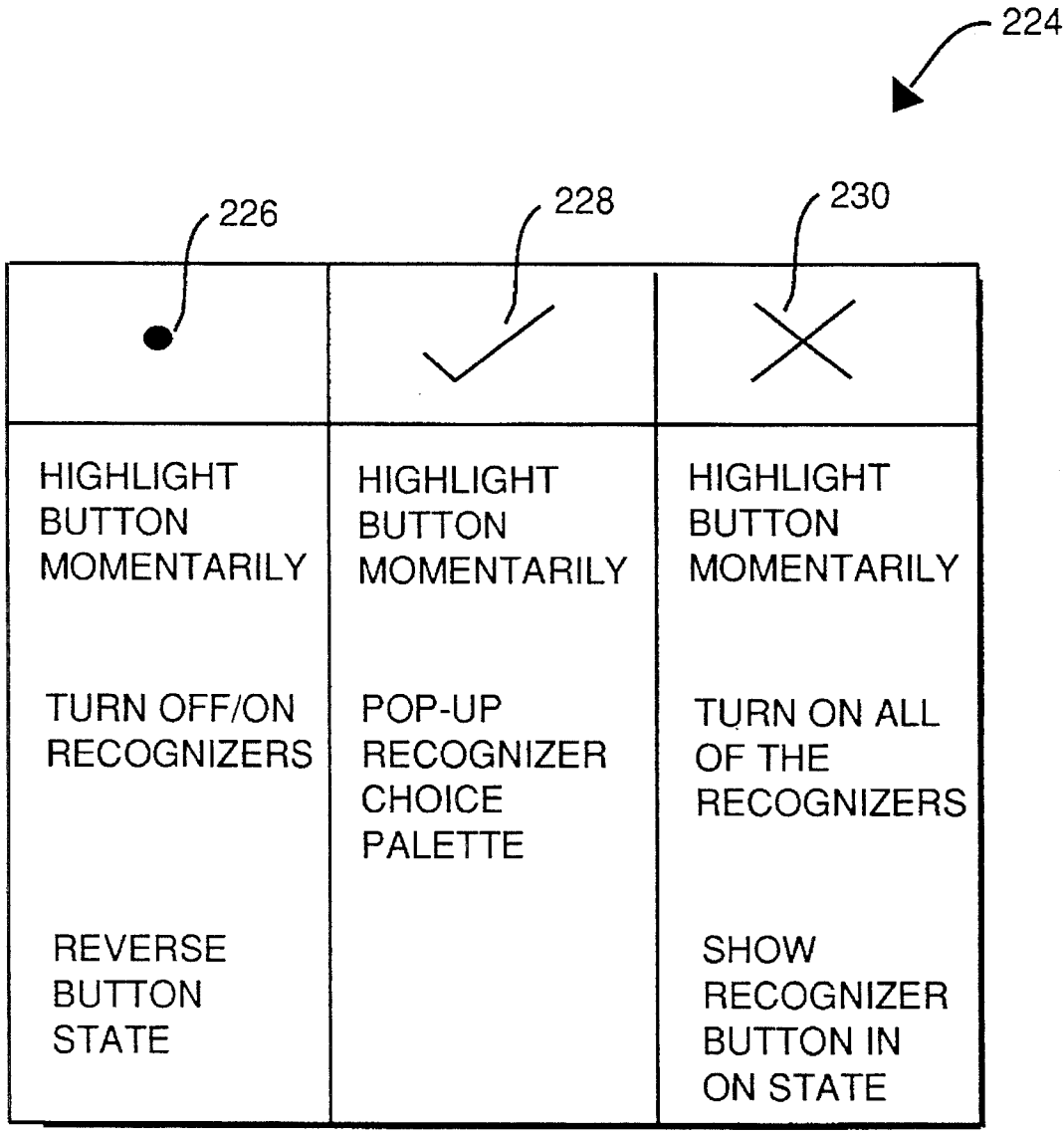
FIG. 9 is a script table for three gestures performed on a soft-button of the present invention.

In FIG. 9, a script table 224 helps determine: (a) whether the gesture is relevant to the button; and (b) what to do when that gesture is detected in association with the button. In this example, a button detects three different types of gestures, a "tap" 226, a "check-mark" 228, and an "X-mark" 230. If the tap gesture 226 is detected, the "script" for the indicated process is to: (1) highlight the button 66 momentarily; (2) toggle (i.e. turn off if on, turn on if off) the recognizers; and (3) reverse the button state. As described previously, the button 66 indicates that the recognizers are on when the button says "recognize", and indicates that they are turned off when there is a diagonal line through the word "recognize". When the check-mark gesture 228 is found to be associated with the button, the process script is to: (1) highlight the button momentarily; and (2) pop up the recognizer palette 78. When the X-mark gesture 230 is detected, the script is: (1) highlight the button 66 momentarily; (2) turn on all of the recognizers; and (3) show the recognizer button in the "on" state. In this example, other gestures performed on the button 66 are considered "non-relevant". Also, a tap, check-mark, or X-mark gesture performed elsewhere on the screen 42 would not be considered relevant to the button 66.

It is desirable that a given gesture should initiate a similar type of process regardless of which button it contacts. For example, a check mark could always means "START", an X-mark could always mean "STOP", etc. The button then provides the specific context for the command initiated by the gesture.

While this invention has been described in terms of several preferred embodiments, there are alterations, permutations, and equivalents which fall within the scope of this invention. It is therefore intended that the following appended claims be interpreted as including all such alterations, permutations, and equivalents as fall within the true spirit and scope of the present invention.

What is claimed is:

1. A gesture sensitive button for a graphical user interface comprising:

a digital processor, a display screen coupled to said digital processor;

a pointer for pointing to locations on said display screen;

a button image displayed on said display screen, said digital processor being responsive without any intermediate input to at least two different button gestures made by said pointer on said display screen at any location over said button image; and gesture recognition means for detecting gestures made on said display screen by said pointer and operative to initiate a process in said digital processor that is determined by a recognizable button gesture made with said pointer on said display screen which selects said button image and which has meaning to said digital processor based upon a context associated with said button image wherein the gesture recognition means is arranged such that the function associated with each of said button gestures will be initiated and executed in an identical manner regardless of the location over the button image that the gesture was made, wherein said digital processor is operable such that when said gesture recognition means recognizes a particular recognizable button gesture for said button image, said digital processor provides feedback relative to said button confirming that said button image has been selected, said feedback relative to said button also indicative of the particular function associated with said particular recognizable button gesture.

2. A gesture sensitive button as recited in claim 1 wherein said digital processor, said display screen, and said pointer are part of a pen-based computer system.

3. A gesture sensitive button as recited in claim 2 wherein said display screen comprises a touch-sensitive screen and said pointer comprises a stylus.

4. A gesture sensitive button as recited in claim 3 wherein a first one of said button gestures is a tap made by said stylus on said screen over any segment of said button image.

5. A gesture sensitive button as recited in claim 4 wherein another of said button gestures is selected from a group consisting of a check-mark and art X-mark that is made by said stylus on said display screen means over said button image.

6. A gesture sensitive button as recited in claim 4 wherein said feedback confirming that said button image has been selected includes altering the appearance of said button image.

7. A method for providing and utilizing a gesture sensitive button for a graphical user interface, wherein the gesture sensitive button has a plurality of distinct gestures associated therewith, each distinct gesture that is associated with the gesture sensitive button having a distinct process associated therewith, the method comprising the steps of:

providing a button image on a computer display screen;

detecting an inputted gesture made upon said computer display screen by a pointer;

determining whether said inputted gesture is associated with said button image by determining whether said gesture contacts said button image and determining whether said gesture is one of the distinct gestures that is associated with the gesture sensitive button; and when the inputted gesture is determined to be associated with the button image, performing the following substeps of: (a) providing feedback relative to the button image confirming that the button image has been selected, (b) providing feedback relative to the button image indicative of the process associated with the inputted gesture, and (c) initiating the process associated with said inputted gesture and the button image.

8. A method for providing a gesture sensitive button as recited in claim 7 wherein said button image comprises a visual representation of a button displayed upon said computer display screen.

9. A method for providing a gesture sensitive button as recited in claim 7 wherein said feedback confirming that the button image has been selected includes altering the visual representation of said button image.

10. A method for providing a gesture sensitive button as recited in claim 7 wherein said computer display screen is a touch sensitive screen and said pointer is a stylus.

11. A method for providing a gesture sensitive button as recited in claim 7 wherein a tap gesture is a first one of the distinct gestures associated with said button image.

12. A method for providing a gesture sensitive button as recited in claim 11 wherein a check-mark gesture is a second one of the distinct gestures associated with said button image.

13. A method for providing a gesture sensitive button as recited in claim 11 wherein an X-mark gesture is a third one of the distinct gestures associated with said button image.

14. A method for providing a gesture sensitive button as recited in claim 7 wherein said determining step includes the step of comparing said gesture with a set of recognizable gestures for said button image.

15. A method for providing a gesture sensitive button as recited in claim 14 wherein said initiating step includes the step of initiating at least one process step when said gesture is one of said set of recognizable gestures.

16. A method for providing a gesture sensitive button as recited in claim 15 wherein said initiating step initiates a plurality of process steps as determined by said gesture.

17. A method for initiating and executing one of a plurality of command sequences from inputs made with a stylus on a gesture sensitive button image displayed on a touch-sensitive display screen of a pen-based computer system, the method comprising the steps of:

displaying a button object having a button context on the display screen of the pen-based computer system, said button object having a button bounding box;

entering with the stylus a gesture object, having a gesture bounding box, anywhere over said button object;

determining whether said gesture bounding box substantially overlaps said button bounding box; and when the gesture bounding box is determined to substantially overlap the button bounding box, performing the steps of (a) providing feedback relative to the button confirming that said button object has been selected; (b) providing feedback relative to the button object indicative a command sequence associated with the entered gesture and (c) executing the command sequence in said pen-based computer system that is associated with the entered gesture without utilizing an intermediate input to the pen-based computer system;

wherein when a first gesture type is entered, the executed command sequence turns a function associated with said button object on if previously off and off if previously on; and wherein when a second gesture type is entered, the executed command sequence brings up a choice palette wherein a further selection within the choice palette can be made and a function associated therewith executed.

18. A method as recited in claim 17 wherein said substantial overlap is an overlap of at least approximately 40% of the gesture bounding box and the button bounding box.

19. A method as recited in claim 17 wherein when a third gesture type is entered, the executed command sequence activates at least one of the functions associated with said button object.

20. A method as recited in claim 17 wherein the gestures types include a tap, a check-mark, and an X-mark.

* * * * *